Jan. 15, 1963 I. KUZMINSKY 3,074,026

VARIABLE ATTENUATION SHARP NOTCH FILTER

Filed May 24, 1960 2 Sheets-Sheet 1

INVENTOR
IRVING KUZMINSKY

BY Max L. Libman

ATTORNEY

INVENTOR
IRVING KUZMINSKY

BY Max L. Libman
ATTORNEY

United States Patent Office 3,074,026

Patented Jan. 15, 1963

3,074,026

VARIABLE ATTENUATION SHARP NOTCH FILTER

Irving Kuzminsky, Silver Spring, Md., assignor to Entron, Inc., Bladensburg, Md., a corporation of Delaware Filed May 24, 1960, Ser. No. 31,305
2 Claims. (Cl. 330—144)

This invention relates to signal transfer networks and more particularly to a variable attenuation narrow bandwidth filter for use in such networks.

The invention has particular applicability to (but is by no means restricted to) a typical situation which occurs in the transmission of television signals on a coaxial cable, as used, e.g., in community antenna television systems, where a broad band of frequencies is desired to be transmitted at one level for video modulated signals, and a narrow band of frequencies is transmitted adjacent the broad band for audio modulated transmission, it being necessary for proper reception to keep the relative levels of the sound and picture carriers at a predetermined relationship, or within a given range of relative amplitudes, typically, to keep the sound carrier at about 15 db below the picture carrier. This relationship has been maintained according to conventional practice by the use of separate amplifiers and filters, with complex automatic gain control (AGC) systems to maintain the proper amplitude relationship and magnitude for propagation of the television signals along the coaxial cable.

It is a primary object of the invention to provide a narrow band attenuating filter having a variable attenuation so that it can be used, e.g., to maintain the amplitude of a sound carrier at or very close to a desired level, without appreciably affecting the frequency characteristic of the transmission system outside of the narrow band required to be thus controlled.

Another object is to provide an AGC system capable of using the same amplifier for maintaining desired relative levels of both a broad band of frequencies and a very narrow band of frequencies without appreciably broadening said narrow band, over a wide amplitude range.

A further object is to provide a voltage-controlled narrow band variable attenuator which can be remotely controlled to vary the attenuation over a wide range of levels.

The specific nature of the invention, as well as other objects and advantages thereof, will clearly appear from a description of a preferred embodiment as shown in he accompanying drawings, in which.

Figure 1:
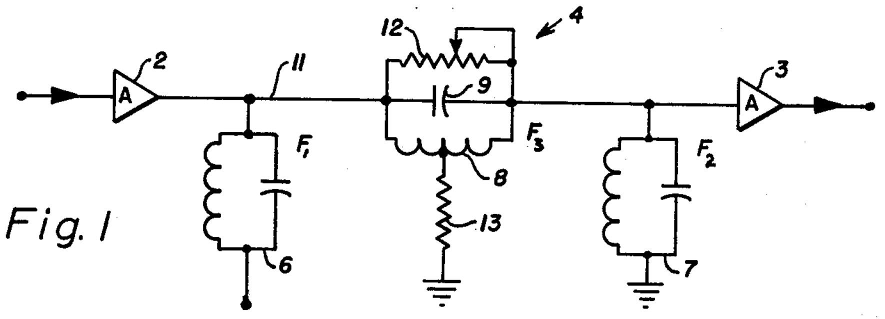
FIG. 1 is a circuit diagram illustrating the basic principle of the invention.
Figure 2:
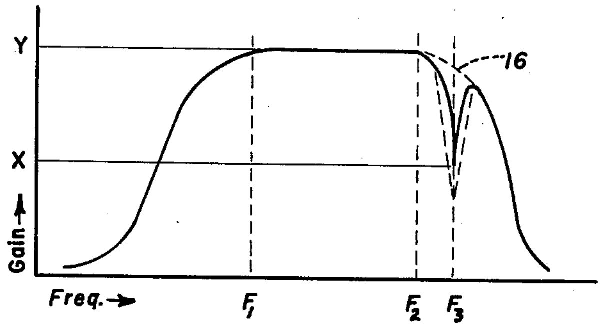
FIG. 2 is a frequency response characteristic curve used in explaining the operation of the invention.

Referring to FIG. 1, a pair of broad-band amplifiers 2 and 3 are shown with a filter network 4 between them which illustrates the principle of the invention. Filters 6 and 7 are respectively stagger-tuned to frequencies $f_1$ and $f_2$ to give a broad pass-band for picture transmission as shown in FIG. 2, while filter 4 is tuned for frequency $f_3$, representing the sound carrier. It is desired to maintain the level of the $f_3$ signals at one value, indicated at X in FIG. 2, or more generally, to maintain the relationship between X and Y (the broad-band level from frequency $f_1$ to frequency $f_2$) constant.

Filter 4 is composed of an inductance 8 and a parallel capacitor 9 inserted in line 11 between the amplifiers 2 and 3. The resistor 12 is included in parallel with elements 8 and 9, and another resistor 13 is connected between ground (or some other reference voltage) and the mid-point of inductance 8. It is known that in such a circuit the resistor 13 can function as a negative resistance with respect to resistor 12, i.e., it can increase or diminish the effective resistor 12 at the resonant frequency of filter 4. When resistor 13 bears the proper relation to resistor 12, i.e., when resistor 13 equals one-quarter of resistor 12 (assuming 12 to represent the resistive component of all of the parallel impedances 8, 9 and 12), the effect is that of a circuit without resistance, and the circuit has a substantially infinite, Q. However, if either resistor 12 or resistor 13 is varied, the resistance, i.e., the effective attenuation of the filter in the resonant frequency range is varied. For example, when resistor 12 is varied between zero and four times the value of resistor 13, the effective resistance across filter 4 at resonance frequency varies from zero to infinity.

The particular advantage of the filter shown is that the width of the narrow band around $f_3$ is very little changed as the depth of the notch $f_3$ is varied; thus, the filter is effective to selectively vary the attenuation at a particular frequency and not appreciably affect the frequency characteristic at any other points on the frequency-attenuation characteristic curve of FIG. 2. This is in contradistinction to other attenuating filters commonly used, which, for example, may vary the attenuation by changing the coupling of the filter to its associated circuit, which also widens or narrows the width of the notch corresponding to $f_3$. This is highly undesirable in many cases, and obviously particularly so in the case of a sound carrier for television (the example given). Note that ordinarily merely adding a resistor to the filter circuit will also attenuate or affect all of the other frequencies in the circuit as well as the frequency to which the filter is tuned, and therefore will not accomplish the same purpose.

Figure 3:
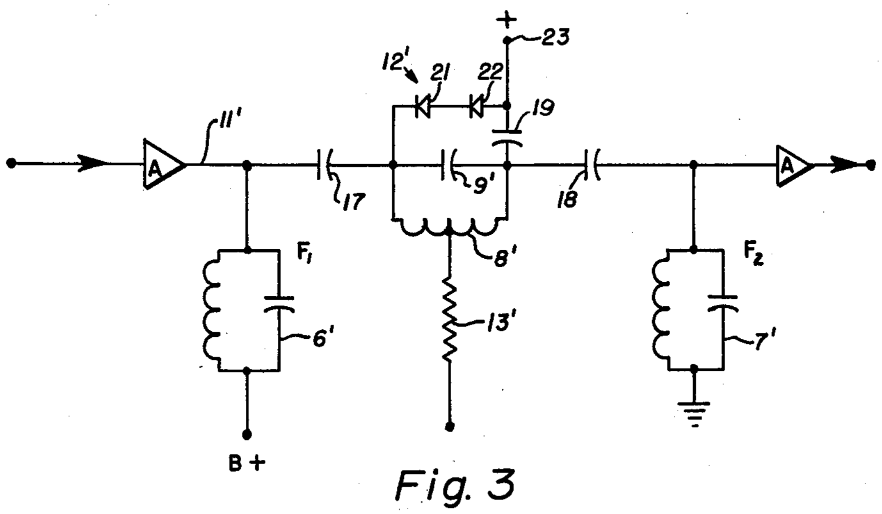
FIG. 3 is a circuit diagram of another form of the invention useful for remote or automatic control of attenuation.
Figure 4:
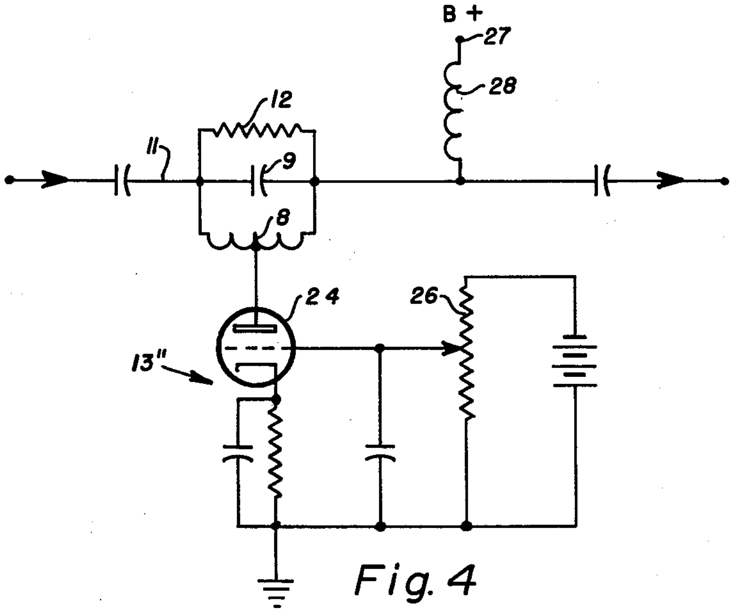
FIG. 4 is a circuit diagram showing another modification of the invention.

In FIG. 1, resistor 12 is shown as manually variable. It is highly desirable to provide a manner of controlling the value of this resistor remotely in accordance with the value of a variable control voltage. FIG. 3 shows an arrangement for doing this. In this FIGURE, elements corresponding to those shown in FIG. 1 are similarly numbered, but with a prime (′) added. It will be seen that the circuit is essentially similar to that shown in FIG. 1, except that coupling condensers 17 and 18 are shown for voltage isolation. The resistor 12 of FIG. 1 is replaced by element 12′, comprising two high-frequency diodes 21 and 22, of low capacitance, which function essentially as a single diode in this circuit, two separate diodes merely being used a practical embodiment in order to reduce the diode capacitance to a negligibly small value. Coupling capacitor 19 is also inserted for voltage isolation. Due to the well-known voltage-resistance characteristic of such diodes, their effective resistance in the circuit may be controlled by applying a suitable variable control voltage at terminal 23. This voltage may be manually controlled from any suitable D.-C. source, or as will be shown below, may be automatically supplied in accordance with the functioning of the associated circuitry for AGC purposes. The effect of applying a control voltage to terminal 23 is therefore similar to that of manually varying the resistance of element 12 of FIG. 1. The advantage of this circuit over the use of a resistor is that the control voltage varies the resistance, without requiring mechanical motion. It will be apparent that instead of using diodes as shown, a vacuum tube could be similarly used in which the plate resistance can be varied by varying the grid bias. FIG. 4 shows an arrangement in which a vacuum tube is thus used; however, in this instance, instead of varying resistor 12, we vary the resistance corresponding to that shown at 13 in FIG. 1. The elements shown at 13″ in this case include a vacuum tube 24 and conventional associated circuitry. The variable control voltage for the grid of the vacuum tube is shown as derived from a conventional potentiometer arrangement 26, although it will be apparent that it may be derived in any suitable manner. Plate voltage for the vacuum tube 24 is supplied at terminal 27 through a high-impedance isolating inductance 28. It will be apparent that as the grid bias is varied, the effective plate resistance will also vary, and thus secure the desired attenuation control for the filter. Since the plate-to-grid capacitance remains substantially constant and the control grid is grounded to the RF signal by the grid by-pass capacity, there is no de-tuning effect produced as the grid voltage is varied, and the advantages of the novel filter circuit are maintained. While remote control of attenuation can be attained in a conventional filter circuit by the use of variable resistance tubes or circuitry, increasing the attenuation in such circuits widens the notch, which is undesirable in most applications. In the present circuit, on the contrary, increasing the attenuation tends to narrow the notch, i.e., the band of frequencies which is attenuated.

Figure 5:
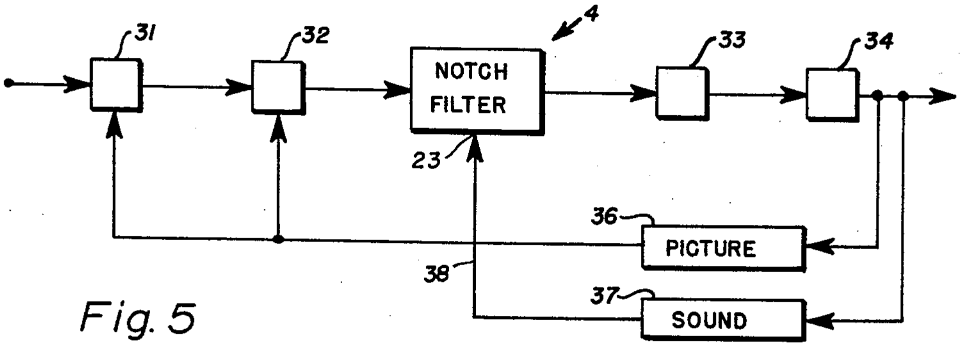
FIG. 5 is a block circuit diagram showing one manner in which the invention may be used for automatic gain control in television transmission.

FIG. 5 shows one manner in which the novel filter may be employed in an AGC circuit to maintain a constant relative level between the sound and picture signals. Blocks 31–34 represent successive stages of a broad-band amplifier tuned to cover the range of the frequency characteristic shown in FIG. 2. The picture signal level is maintained by a conventional AGC circuit 36, the output of which is fed back, for example, to the first two stages 31 and 32 of the amplifier as shown. A separate AGC circuit 37 is tuned to the sound carrier, and produces a bias control voltage on line 38 which is supplied to terminal 23 of filter 4, which may be the circuit shown in FIG. 3. The amplifier stages may be those of any known type of chain amplifier, for example. The operation of the circuit will be obvious in view of the foregoing description. The automatically controlled filter 4 maintains the level of the sound carrier at the desired value, while the AGC circuit 36 maintains the overall output level at the desired constant amplitude. This circuit thus produces independent automatic gain control for the two separate frequency bands through the same amplifier. The necessity for this arises from the fact that the relative value of these signals does not necessarily remain constant under practical conditions, but may vary widely due to atmospheric conditions, temperature, etc., as is well known. Assuming, for example, that the conditions vary so that the sound signal increases; when this occurs, the picture remains constant, so that AGC circuit 36 does not act to change the over-all amplifier gain, but the sound signal output rises. However, AGC circuit 37 automatically corrects for this condition, and the relative values of the two signals remains the same. If the sound signal were permitted to rise to too high a value, there would be sound and picture intermodulation, which produces distortion of the picture, such as cross-hatching, etc. On the other hand, if the sound falls to too low a level, a hissing sound is produced, which is equally undesirable. Present arrangements for maintaining this relationship require use of separate amplifiers, or separate tuning of components of the amplifier, all of which is both expensive and difficult to maintain at the proper operating level.

It will be apparent that the embodiments shown are only exemplary and that various modifications can be made in construction and arrangement within the scope of my invention as defined in the appended claims.

I claim:

1. In a broad-band transmission line, means for maintaining a predetermined relation between a broad frequency band of signals transmitted on said line and a narrow band of signals transmitted on said line, said means comprising broad-band amplifier means connected to said line for amplifying both bands of signals, AGC means connected to the output of said amplifier means for controlling the gain of said amplifying means at said broad band of frequencies, further AGC means also connected to the output of said amplifier means and producing an output voltage which is a function of the gain of said amplifier at said narrow band of frequencies, filter means in said transmission line tuned to said narrow band and having voltage-controlled variable attenuation means for varying the attenuation of said filter means in said narrow band, and circuit means connecting said output voltage to said variable attenuation means to control the attenuation thereof to maintain the desired predetermined relation.

2. The invention according to claim 1, said filter means comprising a parallel resonant circuit having inductive reactance means and capacitive reactance means in parallel between two points, a resistor connected between said two points, said inductive means comprising an inductance coil having an intermediate tap, a second resistor connected between said tap and a reference voltage point, and control means for varying at least one of said resistors, said control means being responsive to said output voltage.

References Cited in the file of this patent

UNITED STATES PATENTS

| | | |
|---|---|---|
| 2,304,545 | Clement | Dec. 8, 1942 |
| 2,567,380 | Kingsbury | Sept. 11, 1951 |
| 2,676,308 | Vos et al. | Apr. 20, 1954 |
| 2,866,015 | Sailor | Dec. 23, 1958 |
| 2,902,548 | Moeller | Sept. 1, 1959 |
| 2,915,711 | Stanford | Dec. 1, 1959 |
| 2,946,017 | Murphree | July 19, 1960 |

FOREIGN PATENTS

| | | |
|---|---|---|
| 1,056,808 | France | Oct. 28, 1953 |